(12) United States Patent
Hendou et al.

(10) Patent No.: US 10,669,178 B2
(45) Date of Patent: Jun. 2, 2020

(54) METHOD FOR TREATING INDUSTRIAL WATER BY PHYSICAL SEPARATION, ADSORPTION ON RESIN AND REVERSE OSMOSIS, AND CORRESPONDING PLANT

(71) Applicant: Veolia Water Solutions & Technologies Support, Saint-Maurice (FR)

(72) Inventors: Mouloud Hendou, Prunay en Yveline (FR); Camille Sagne, Issy les Moulineaux (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 663 days.

(21) Appl. No.: 14/783,521

(22) PCT Filed: Apr. 8, 2014

(86) PCT No.: PCT/EP2014/057013
§ 371 (c)(1),
(2) Date: Oct. 9, 2015

(87) PCT Pub. No.: WO2014/166929
PCT Pub. Date: Oct. 16, 2014

(65) Prior Publication Data
US 2016/0060151 A1    Mar. 3, 2016

(30) Foreign Application Priority Data

Apr. 10, 2013 (FR) .................... 13 53216
Apr. 19, 2013 (FR) .................... 13 53580
Dec. 5, 2013 (FR) .................... 13 62206

(51) Int. Cl.
*B01D 15/00* (2006.01)
*C02F 9/00* (2006.01)
(Continued)

(52) U.S. Cl.
CPC .............. *C02F 9/00* (2013.01); *B01D 61/025* (2013.01); *B01D 61/145* (2013.01);
(Continued)

(58) Field of Classification Search
None
See application file for complete search history.

(56) References Cited

U.S. PATENT DOCUMENTS 4,026,795 A * 5/1977 Okamoto ................ C01B 32/36
502/33
4,839,331 A * 6/1989 Maroldo .................. B01J 20/20
502/402

(Continued)

FOREIGN PATENT DOCUMENTS

CA          2134160 C  * 12/1999 .............. F02B 43/00

OTHER PUBLICATIONS

Ray et al., Produced Water, Environmental Science Research, vol. 46 (Year: 1992).*

*Primary Examiner* — Allison G Fitzsimmons
(74) *Attorney, Agent, or Firm* — Coats & Bennett PLLC

(57) ABSTRACT

The present invention relates to a method for treating industrial water containing organic matter, said method comprising:
  a step of physical separation producing wastes and an effluent;
  a step of adsorption of at least one part of said organic matter present in said effluent on at least one adsorbent resin chosen from the group comprising the non-ionic cross-linked resins and the microporous carbon resins;
  a step of reverse osmosis filtration downstream from said adsorption step.

10 Claims, 2 Drawing Sheets

(51) Int. Cl.
  *C02F 1/28* (2006.01)
  *C02F 1/44* (2006.01)
  *B01D 61/02* (2006.01)
  *B01D 61/14* (2006.01)
  *B01D 61/58* (2006.01)
  *B01D 71/34* (2006.01)
  *B01D 71/36* (2006.01)
  *B01D 71/56* (2006.01)
  *B01J 20/20* (2006.01)
  *B01J 20/34* (2006.01)
  *B01J 20/26* (2006.01)
  *B01D 37/00* (2006.01)
  *C02F 101/10* (2006.01)
  *C02F 101/32* (2006.01)
  *C02F 103/36* (2006.01)
  *C02F 101/34* (2006.01)

(52) U.S. Cl.
  CPC ........... *B01D 61/147* (2013.01); *B01D 61/58* (2013.01); *B01D 71/34* (2013.01); *B01D 71/36* (2013.01); *B01D 71/56* (2013.01); *B01J 20/20* (2013.01); *B01J 20/267* (2013.01); *B01J 20/3416* (2013.01); *B01J 20/3425* (2013.01); *B01J 20/3466* (2013.01); *B01J 20/3475* (2013.01); *C02F 1/283* (2013.01); *C02F 1/285* (2013.01); *C02F 1/441* (2013.01); *C02F 1/444* (2013.01); *B01D 2311/04* (2013.01); *B01D 2311/103* (2013.01); *B01D 2315/06* (2013.01); *C02F 2101/108* (2013.01); *C02F 2101/32* (2013.01); *C02F 2101/322* (2013.01); *C02F 2101/327* (2013.01); *C02F 2101/34* (2013.01); *C02F 2101/345* (2013.01); *C02F 2103/36* (2013.01); *C02F 2103/365* (2013.01); *C02F 2209/02* (2013.01); *C02F 2303/16* (2013.01)

(56) References Cited

U.S. PATENT DOCUMENTS

| | | |
|---|---|---|
| 5,135,656 A | 8/1992 | Means et al. |
| 5,236,594 A | 8/1993 | O'Reilly et al. |
| 5,531,902 A | 7/1996 | Gallup |
| 5,614,100 A | 3/1997 | Gallup |
| 5,922,206 A | 7/1999 | Darlington, Jr. et al. |
| 6,117,275 A * | 9/2000 | Baumann ............... B01D 1/305 159/44 |
| 6,270,676 B1 * | 8/2001 | Grund ...................... B01J 20/34 210/669 |
| 6,425,941 B1 * | 7/2002 | Roodman .............. B01D 53/02 502/416 |
| 7,501,061 B2 * | 3/2009 | Wood ....................... A61K 9/08 210/636 |
| 7,520,993 B1 * | 4/2009 | Laraway ................ B01D 61/58 210/175 |
| 7,731,854 B1 | 6/2010 | Herbst |
| 8,734,650 B2 | 5/2014 | Bradley |
| 8,801,921 B2 | 8/2014 | Ikebe et al. |
| 2010/0292844 A1 * | 11/2010 | Wolf ........................ C02F 9/00 700/271 |
| 2011/0089013 A1 | 4/2011 | Sakurai et al. |
| 2011/0094963 A1 | 4/2011 | Tada et al. |
| 2012/0160753 A1 * | 6/2012 | Vora ..................... B01D 61/022 210/175 |
| 2013/0168315 A1 | 7/2013 | Minier Matar et al. |

\* cited by examiner

METHOD FOR TREATING INDUSTRIAL WATER BY PHYSICAL SEPARATION, ADSORPTION ON RESIN AND REVERSE OSMOSIS, AND CORRESPONDING PLANT

This application is a U.S. National Stage Application of PCT Application No. PCT/EP2014/057013, with an international filing date of 8 Apr. 2014. Applicant claims priority based on French Patent Application Nos. 1353216 filed 10 Apr. 2013, 1353580 filed 19 Apr. 2013 and 1362206 filed 5 Dec. 2013. The subject matter of these applications is incorporated herein.

1. FIELD OF THE INVENTION

The field of the invention is that of the treatment of industrial effluents, especially those having a relatively high temperature.

More specifically, the invention relates especially to the treatment of waste hot water coming from the gas, petroleum or petrochemical industries, such as production installations of petroleum and/or gas fields or again refineries.

PRIOR ART

The recycling of water from industrial effluents is a major problem to which a great deal of research has been devoted in this past decade.

This problem is particularly acute in the gas and petroleum industries where it is being sought, after treatment, to re-utilize production water from the petroleum and gas fields or again water used in the refining of petroleum products. Indeed, water is often scarce and costly, especially in petroleum or gas extraction sites.

Such industrial water however has the particular feature by which its temperature can be high. In practice, this temperature can be higher than about 55° C. and, in certain cases, it can rise up to 98° C., and can be charged with organic matter. This water can also contain matter in suspension (MIS), hydrocarbons and insoluble oils, soluble organic matter. It can also have a high alkalinity and hardness and a certain degree of salinity, and it can contain silica and boron.

One of the applications of recycling this industrial water consists in producing steam inside a boiler.

Given its composition, this water however is not suited to being re-utilized, for example in this context, without being preliminarily treated.

The methods currently implemented for treating such industrial water make use of techniques successively implementing:

- a filtration, for example of the microfiltration or ultrafiltration type, on ceramic membranes;
- biological treatment;
- reverse osmosis filtration.

Filtration on ceramic membranes reduces the content of these industrial waters in hydrocarbons and insoluble oils. Biological treatment reduces the content of these waters in soluble organic matter. Filtration by reverse osmosis for its part reduces alkalinity, hardness, salinity and the silica and boron content of this water.

Filtration on active carbon can be implemented between biological treatment and reverse osmosis as a finishing treatment for the elimination of soluble organic matter.

The methods used for this type of treatment reduce the content in pollutants of the industrial water. However, they have limits in terms of performance, operability and running costs.

Given the high temperature of this industrial water, the microfiltration or ultrafiltration step entails the use of ceramic membranes since the integrity of organic filtration membranes is liable to get degraded by such temperatures.

However, ceramic membranes are costly to purchase and to maintain. When the flowrate of effluent to be treated is high, the number of membrane filtration units used must also be great, and this increases investment and running costs.

Furthermore, the ceramic linings ($TiO_2$, CSi) of these membranes can act as catalysts causing certain reactions of oxidation of organic matter or the combination of certain organic compounds with metals available in this water, giving rise to the formation of organo-metallic compounds. These compounds are sources of clogging of the ceramic membranes. In practice, they lead to an increase in the frequency with which these membranes are cleaned.

Besides, such water can have a high level of hardness resulting especially from high content in alkaline-earth elements, chiefly calcium and/or magnesium. This high level hardness, combined with high interface-passage speeds, generally ranging in practical terms from 1.5 to 5 m/s, needed for the working of these membranes, can give rise to a premature erosion of these membranes and, as a corollary, can make it necessary to replace them ahead of schedule.

Besides, the implementation of the biological treatment step to eliminate soluble organic matter necessitates a preliminary cooling of this water to make it compatible with this type of treatment. Now, cooling apparatuses on the whole increase the size of the installation and, as a corollary, increase the investment. In addition, such cooling can lead to a negative energy balance for the treatment. This is especially true as there is an interest in re-utilizing treated water in the context of the methods from which they are derived, especially to produce extraction steam. Indeed, these sites are often at places where water is scarce and therefore costly. Operations for cooling water that is to be reheated, after treatment, in order to be re-utilized, for example in the form of steam, therefore have a negative impact on the energy balance.

It will also be noted that biological treatment gives rise to sludges, the quantity of which is proportional to the flowrate of effluents treated and to the concentration in organic matter contained in these sludges. These sludges are a waste whose treatment entails an economic and technical problem.

Finally, the reverse osmosis membranes conventionally implemented should not be continuously exposed to temperatures greater than 42° C. with 45° C. peaks. Otherwise they will lose their mechanical integrity. A cooling of the water therefore also has to be done prior to the reverse osmosis filtration. This causes the same drawbacks as those inherent in the cooling prior to the biological treatment.

In short, these techniques of treatment on ceramic membranes, biological treatment and then reverse osmosis have limited value in the treatment of industrial water, especially production hot water from the petroleum and gas fields.

3. GOALS OF THE INVENTION

It is a goal of the invention especially to provide an efficient solution to at least some of these different problems.

In particular, it is a goal of the present invention to propose an improved method for treating industrial aqueous effluents, especially those coming from the gas and petroleum or petrochemical industries, such as the production installations of petroleum and/or gas fields or again refineries which could have high temperatures.

In particular, it is a goal of the present invention to present a method of this kind which, in at least one embodiment, improves the rate of conversion of the reverse osmosis filtration units, i.e. increases the percentage of re-utilizable water, produced in the form of permeate by these units, relative to the water supplied to them while at the same time reducing the volumes of reverse osmosis concentrate.

It is yet another goal of the present invention to disclose a method of this kind which, in at least one embodiment, increases the service life of the reverse osmosis membranes.

In particular, it is a goal of the present invention to describe a method of this kind which, in at least one embodiment, reduces the costs of existing methods implementing filtration on ceramic membranes while at the same time showing performance at least similar to that of these membranes.

It is yet another goal of the present invention to describe a method of this kind which, in at least one embodiment, reduces the frequency of washing of the reverse osmosis membranes leading to savings in washing reactants and to a reduction of the costs of treatment of the fouled wash water.

It is yet another goal of the present invention to propose a method of this kind which, in at least one embodiment, enables the recovery of the pollutants contained in the water, thus enabling these pollutants to be re-utilized in the form of products.

It is yet another goal of the present invention to disclose a plant or installation for the implementation of such a method.

4. SUMMARY OF THE INVENTION

At least some of these goals, and other possible ones which shall appear here below are achieved through the present invention which pertains to a method for treating industrial water, said method comprising:
- a step of physical separation producing wastes and an effluent;
- a step of adsorption of at least one part of said organic matter present in said effluent on at least one adsorbent resin chosen from the group comprising the non-ionic cross-linked resins and the microporous carbon resins;
- a step of reverse osmosis filtration downstream from said adsorption step.

The present invention therefore proposes a method for treating industrial water combining physical separation, adsorption on resin and reverse osmosis.

Thus, the invention proposes a method for treatment that does not implement the step of biological treatment and therefore has no sludges resulting from such treatment.

According to the invention, the re-utilization of non-ionic adsorbent resin (which excludes ion-exchange resins) taking the form of a non-ionic cross-linked polymer resins and/or microporous carbon resins ensures the protection of the reverse osmosis membranes against the organic matter contained in industrial water coming from the petroleum, gas and petrochemical industries, especially production water from the petroleum and gas fields.

The present invention makes it possible to operate at low or high flow rates of water to be treated, whatever the concentration of the organic compounds harmful to the reverse osmosis membranes present in this water.

The present invention enables the efficient reduction of pollution in insoluble compounds, matter in suspension and soluble organic matter as well as the hardness, alkalinity, salinity and silica and boron content of industrial water. It does so efficiently, making this treated water suitable for subsequent use in the context of various industrial uses, especially as water for supplying boilers to produce steam.

The technique according to the invention thus improves the treatment of industrial water.

Said water could be hot industrial effluents having a temperature higher than 55° C. and lower than or equal to 98° C.

In one advantageous embodiment, said step of physical separation is a membrane filtration In this case, said membrane filtration is of a microfiltration or ultrafiltration type conducted on at least one membrane chosen from the group constituted by the immersed membranes or pressurized membranes made of polytetrafluoroethylene (PTFE) and the tubular membranes made of polyvinylidenefluoride (PVDF).

Said step of reverse osmosis is carried out on at least one membrane made of composite polyamide Such microfiltration or ultrafiltration membranes and reverse osmosis membranes have the advantage of not having their performance deteriorate because of the high temperature of the treated water. The adsorbent resins selected according to the method of the invention do not have their performance degraded by the high temperature of the water to be treated. The technique of the invention therefore does not require the implementation of a step for cooling hot effluents, whether upstream to the adsorption on resins or upstream to the reverse osmosis.

Since the method of the invention does not require the cooling of the water to be treated, the energy balance of this method is improved as compared with the prior art methods which implement cooling upstream to the biological treatment and/or downstream to the reverse osmosis.

A method according to the invention could especially be implemented to ensure the treatment of water coming from the petroleum or gas industries such as for example production water from the petroleum or gas fields.

Water is generally scarce and costly in petroleum and gas fields. A constant preoccupation of the operators of these sites is to limit water consumption, especially by re-utilizing de-polluted industrial water.

Thus, in this case as possibly in other cases, the method of the invention additionally includes a step for recovering said water at the end of said step of reverse osmosis with a view to its industrial re-utilization.

In practice, this industrial water generally shows, before treatment:
- a concentration in insoluble hydrocarbons of 1 to 3,000 mg/L;
- a concentration in matter in suspension of 90 to 500 mg/L.

It also generally has a concentration in soluble organic matter of 10 to 8000 mg/L.

It also generally has:
- salinity of 500 to 37,000 mg/L;
- a concentration in silica of 20 to 250 mg/L;
- a concentration in boron of 1 to 80 mg/l;
- an alkalinity of 80 to 1,000 mg/L of $CaCO_3$;
- hardness of 20 to 50 000 mg/L of $CaCO_3$.

In general, the technique of the invention can especially be applied to the treatment of hot water containing insoluble hydrocarbons, matter in suspension, soluble organic matter, salinity, alkalinity, hardness, silica and boron.

According to one advantageous embodiment, said step of adsorption is implemented on a specific resin dedicated to the elimination of a target compound.

According to another advantageous embodiment, said step of adsorption is implemented on two or more resins enabling the elimination of one or more compounds.

The choice of the adsorbent resin or resins is made according to the nature and concentration of the pollutants present in the effluents to be treated.

Preferably, a method according to the invention comprises a step of in-situ regeneration of said at least one resin.

Advantageously, said step of regeneration is carried out by a regeneration medium chosen from the group constituted by superheated steam at a temperature ranging from 120° C. to 200° C., preferably from 120° C. to 150° C., a solvent with a low boiling point, a base, an acid, or a combination of two or more of these regeneration media.

According to one variant, said regeneration medium is a solvent with low boiling point, such as alcohol, and it furthermore comprises a subsequent step for recycling said solvent by evaporation leading to the obtaining of two phases:
- a condensed phase constituted by a regenerated solvent capable of being re-utilized during a subsequent step of in-situ regeneration of said at least one resin, and
- an organic phase constituted by adsorbed organic matter.

According to another variant, that said regeneration medium is steam, and it additionally comprises a subsequent step of condensation of said steam leading to the obtaining of two phases:
- an aqueous phase constituted by water saturated in organic compounds, and
- an organic phase constituted by adsorbed organic matter.

In this case, said method preferably further a step for treating said aqueous phase constituted by water saturated in organic compounds consisting in making it pass on said at least one adsorbent resin so as to de-saturate it of organic compounds and leading to water that can be re-utilized during a subsequent step of in-situ regeneration of said at least one resin.

When said industrial water, treated by the method of the invention, is production water from petroleum fields and/or gas fields, said organic phase constituted by adsorbed organic matter obtained during the regeneration of the resin is constituted by petroleum and various forms of organic matter such as benzene, toluene, xylene, ethylbenzene and styrene which can thus be recovered. The invention then enables the recovery of the organic compounds as products. This was not possible in the prior art.

The wastes coming from the physical separation, especially the permeate coming from microfiltration or ultrafiltration, contain hydrocarbons and the insoluble oils initially contained in industrial water.

Thus, a method according to the invention preferably comprises a step for recovering these wastes with a view to valorizing them as products.

The present invention also pertains to a plant for the treatment of water to implement a method according to any one of the variants described further above.

Such a plant comprises:
- means for leading in industrial water;
- means of physical separation comprising an inlet connected to the means for leading in and an outlet for discharging effluents and an outlet for discharging wastes;
- at least one column housing at least one adsorbent resin chosen from the group comprising the non-ionic cross-linked resins and the microporous carbon resins, said column comprising an inlet connected to the outlet for discharging effluents from said means of separation and an outlet for water;
- at least one unit for filtration by reverse osmosis comprising an inlet connected to the outlet of water from said column and an outlet of treated water.

Said means of physical separation preferably comprise at least one microfiltration or ultrafiltration type of filtration membrane chosen from the group constituted by the immersed or pressurized membranes made of polytetrafluoroethylene (PTFE) and tubular membranes made of polyvinylidenefluoride (PVDF).

According to one advantageous embodiment, a plant according to the invention comprises means for regenerating said at least one resin by means of a regeneration medium chosen from the group constituted by superheated steam at a temperature of 120° C. to 200° C., preferably 120° C. to 150° C., a solvent with a low boiling point, a base, an acid, or by the combination of two or more of these regeneration media.

According to an advantageous variant, such a plant comprises means for recycling said solvent by evaporation/condensation after it has passed through said at least one column.

According to another variant, said plant comprises means for condensation of steam after it has passed through at least one column, means for conveying the aqueous phase thus obtained at the head of said column, and means for the recovery, at the foot of this column, of water capable of being heated to give regeneration steam.

5. LIST OF FIGURES

Other features and advantages of the invention shall appear more clearly from the following description of particular embodiments, given by way of a simple, illustratory and non-exhaustive embodiment and from the appended drawings, of which:

6. DESCRIPTION OF A PARTICULAR EMBODIMENT

The invention as well as its different advantages will be understood more clearly from the following description of an embodiment given by way of a non-exhaustive illustration.

6.1. Plant 6.1.1. General Architecture

Figure 1:
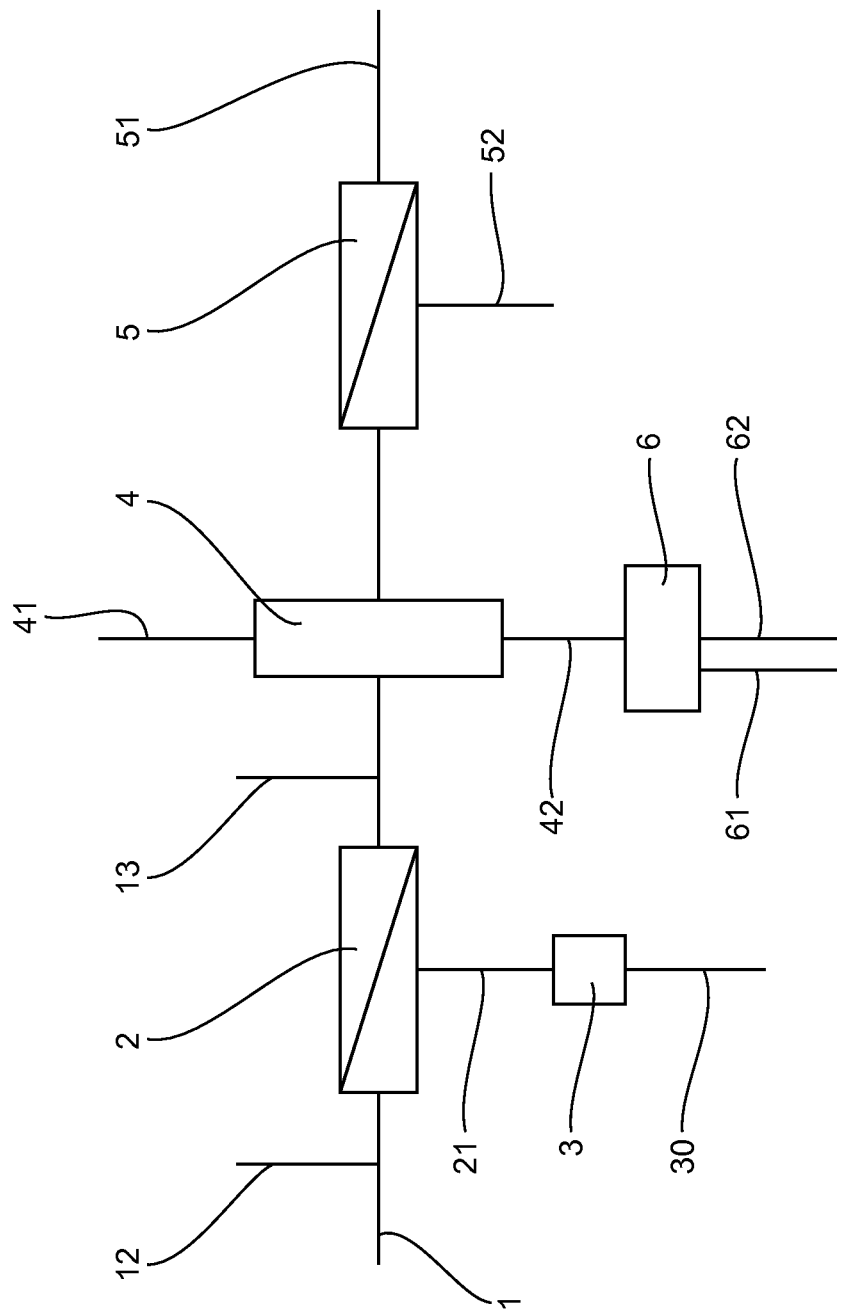
FIG. 1 illustrates a simplified diagram of an example of an installation according to the invention.

FIG. 1 illustrates the general architecture of a plant for treating water according to the invention.

As shown in this FIG. 1, such a plant comprises water leading-in means, such as a pipe, for leading in polluted water to be treated towards a physical separation unit 2.

This physical separation unit 2 can comprise one or more cascade-mounted microfiltration or ultrafiltration type membrane filtration modules. The membranes of these modules, which are commercially available, are of the immersed or pressurized type made of polytetrafluoroethylene (PTFE) or are tubular and made of polyvinylidene fluoride (PVDF).

In variants, this physical separation unit could for example include tubes enclosing filtration membranes, and these tubes can be polymeric (vinyl polychloride), composite or metallic pumps for supplying and pumps for cleaning.

This physical separation unit 2 leads to the implementation of a step of separation enabling the elimination of the matter in suspension and of the water-insoluble hydrocarbons, in practice free oils, contained in the effluents which are discharged by means of an outlet of wastes 21. These wastes are sent towards a zone 3 for treatment by heating and centrifugation in order to recover the insoluble hydrocarbons separated from water. These hydrocarbons are recovered with an efficiency of 95%, in a form that can be valorized, by the pipe 30.

The plant also includes means for leading in 12 and means for discharge 13 of a solution of reactant for the in situ washing of the physical separation unit 2.

The effluents coming from the physical separation unit 2 are directed towards at least one column 4 containing at least one adsorbent resin chosen from the group comprising non-ionic cross-linked resins and microporous carbon resins. The step of treatment by adsorption on resin enables the elimination of the soluble organic matter initially present in the water to be treated.

After having travelled through the column 4, the water is conveyed to at least one reverse osmosis filtration unit 5.

The plant comprises means for regenerating resins. These means of regeneration comprise means for injecting 41, such as a pipe or an injector for injecting steam and/or solvent into the column 4. Through such means, the matter adsorbed on the resins can be detached from the resins.

When the regeneration step is performed by means of a solvent, the solvent charged with organic matter can, entirely or partly, be recovered at the outlet of the column 4 by the pipe 42 in order to undergo evaporation within an evaporator 6 leading to the obtaining of two phases: a condensed phase, constituted by recycled, regenerated solvent, discharged by a pipe 61, and an organic phase constituted by adsorbed organic matter discharged by a pipe 62.

When the regeneration step is performed with steam, the steam can be discharged after condensation by the pipe 42, the condensation leading to the obtaining of two phases: an aqueous phase constituted by water saturated with organic compounds and an organic phase constituted by adsorbed organic matter. The aqueous phase can then be made to pass on the column of adsorbent resin so as to de-saturate it of organic compounds. This leads to water that can be re-utilized to make steam during a subsequent step of in situ regeneration of the resins.

The reverse osmosis filtration unit 5 comprises membranes made of composite polyamide (of a spiral-wound type with low clogging that can take pressures of up to 41 bars). It has the advantage of having low clogging and the ability to withstand temperatures of up to 85° C. This unit could include several passes (filtration of the permeate coming from the reverse osmosis unit through the unit) or several stages (several cascade-mounted reverse osmosis units: the concentrate coming from one unit being filtered in the following unit). The treated water coming from the reverse osmosis filtration unit is collected by the pipe 51 while the wastes coming therefrom are discharged by the pipe 52. The reverse osmosis step reduces the alkalinity, the salinity, the hardness, the silica and the boron.

6.1.2. Example of One Embodiment

Figure 2:
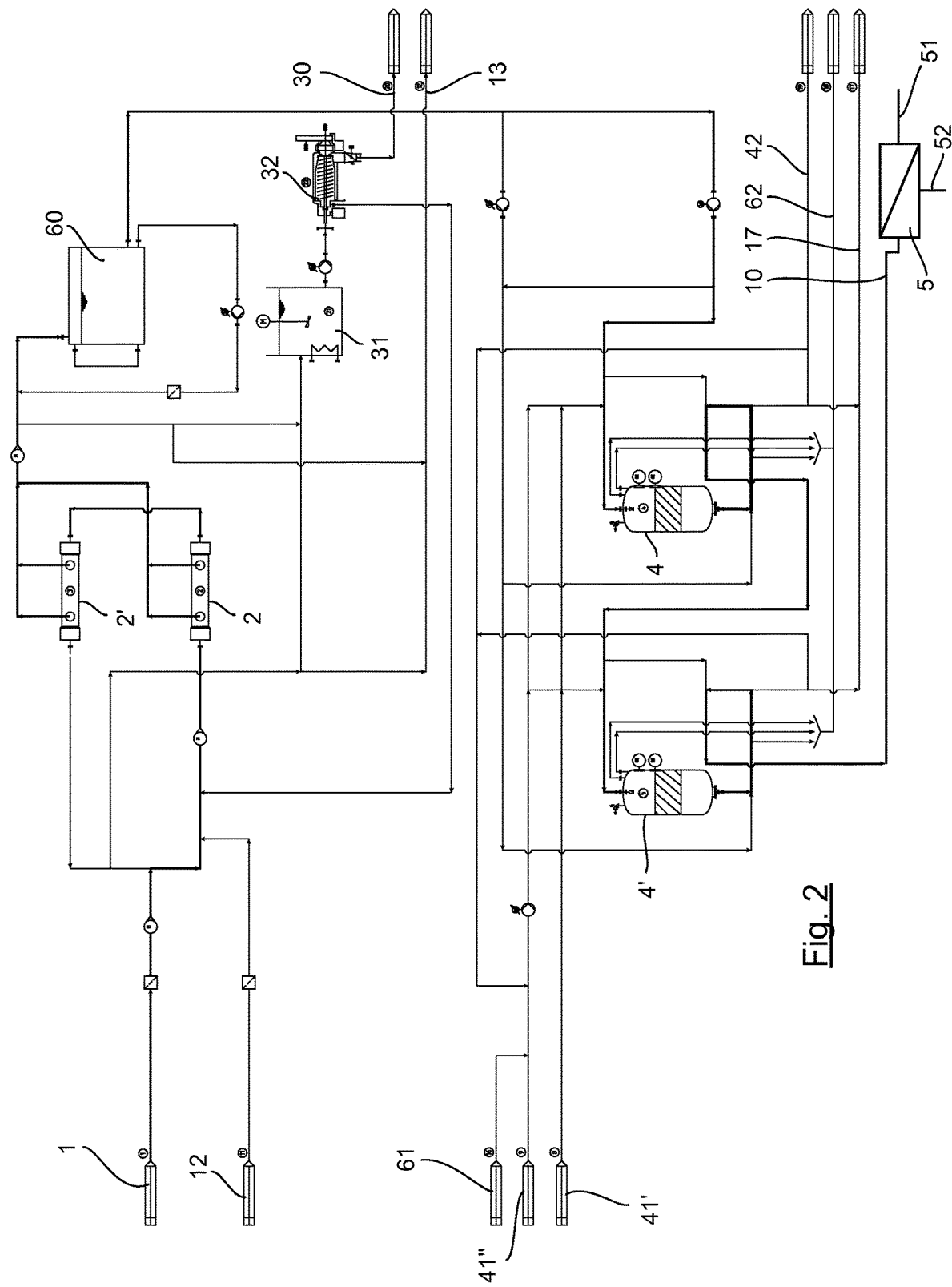
FIG. 2 illustrates a detailed embodiment of a plant according to the invention.

The embodiment described with reference to FIG. 2 represents the schematic view of a pilot plant implementing a method according to the invention for the treatment of production water from petroleum fields.

The pilot plant comprises means for leading in polluted water to be treated to a unit of physical separation by ultrafiltration herein implementing two cascade-mounted ultrafiltration membrane modules 2, 2'. The membranes of these modules, which are commercially available, are made of polyvinylidene fluoride (PVDF). They are fixed to a coating made of polyester and the mean diameter of their pores is 30 nm. This filtration unit enables the elimination of the matter in suspension and the water-insoluble hydrocarbons, in practice free oils, contained in the effluents.

The recovery of the insoluble hydrocarbons stopped by the membranes is achieved by separation of the matter that has collected on the interface of the membranes, corresponding to the concentrate, by heating and by centrifugation. The heating is done in a tank 31 and the centrifugation is done in a centrifuge 32. These hydrocarbons are recovered with an efficiency of 95%, in a form that can be valorized, by the pipe 30.

The pilot plant furthermore includes means for conveying 12 and means for discharging 13 a solution of reactant for in situ washing of the ultrafiltration membranes.

After having undergone this ultrafiltration step, the effluents are directed, in the example, towards an optional buffer tank 60 and then directed towards two series-mounted columns 4, 4' containing two specific resins.

The first column 4 contains a commercially available non-ionic cross-linked polymer resin (resin 1) selected for its capacity to adsorb aromatic components such as BTEX (benzene, toluene, ethylbenzene, xylene) and the polycyclic compounds such as the PACs (e.g. naphthalene). The characteristics of this resin are given in the Table 1 here below:

TABLE 1

| Physical and chemical properties | |
| --- | --- |
| Ionic form | neutral |
| Functional groups | none |
| Matrix | Cross-linked polystyrene |
| Structure | Porous beads |
| Coefficient of uniformity | 1.1 max |
| Mean size of beads | 0.44 to 0.54 mm |
| Bulk density | 600 g/l |
| Water retention capacity | 600 g/kg resin +/−5% |
| Specific surface area (BET method) | About 800 m$^2$/g approximately |
| Volume of pores | 1.2 cm$^3$/g approximately |
| Average diameter of pores | 5 to 10 nm |
| pH stability | 0 to 14 |
| Temperature stability | −20° C. to 120° C. |

The second column 4' contains a microporous carbon resin (resin 2), also commercially available, selected for its ability to fix compounds in trace states more advantageously. The characteristics of this resin are given in the Table 2 here below:

TABLE 2

| Physical and chemical properties | |
| --- | --- |
| Ionic form | neutral |
| Functional group | none |
| Matrix | carbon |
| Grain size | 0.4 to 0.8 mm (>90%) |
| Bulk density | 550 to 650 g/l +/−5% |
| Specific surface area (BET method) | About 1200 m$^2$/g |
| Volume of pores | About 0.15 cm$^3$/g |
| Average diameter of pores | 8 nm |
| Temperature stability | −20° C. to 300° C. |

After having travelled successively in transit in the columns 4 and 4', the water is conveyed towards a reverse osmosis filtration unit 5.

The pilot plant comprises means for regenerating resins, either by steam or by a solvent. These means for regeneration comprise pipes for leading in steam 41' and/or solvent 41" leading into the columns 4, 4'. Through such means, the matter adsorbed on the resins can be detached from them.

When the regeneration is done by means of a solvent, the solvent charged with organic matter can be entirely or partly recovered at the outlet from the columns by the pipe 42 in order to undergo an evaporation leading to the obtaining of two phases: a condensed phase, constituted by recycled, regenerated solvent and brought to the pipe 61 leading into the pipe 41', and an organic phase constituted by adsorbed organic matter, discharged by a pipe 62. When the regeneration is done with steam, this steam can be discharged after condensation by the pipe 17, the condensation leading to the obtaining of two phases: an aqueous phase constituted by water saturated in organic compounds and an organic phase constituted by adsorbed organic matter. The aqueous phase can then be passed over the first column of adsorbent resin so as to desaturate it of organic compounds. This gives water that can be re-utilized to make steam during a subsequent step of in situ regeneration of the resins.

The characteristics of the production water from a petroleum field treated by means of the plant described here above are explained in the Table 3 here below.

TABLE 3

| Parameter | Unit | Range of values |
|---|---|---|
| Temperature | ° C. | 20-70 |
| pH | upH | 6.5-7.5 |
| Chloride | mg/L | 2500-5000 |
| Sulfate | mg/L | 500-2000 |
| Alkalinity | ppm $CaCO_3$ | 500-2000 |
| Sodium | mg/L | 1500-3500 |
| Calcium | mg/L | 200-2000 |
| Magnesium | mg/L | 50-300 |
| Dissolved salts | mg/L | 5000-10000 |
| Benzene | mg/L | 1-30 |
| Toluene | mg/L | 1-30 |
| Ethylbenzene | mg/L | 1-10 |
| Xylene | mg/L | 1-5 |
| Phenol | mg/L | 1-30 |
| Naphtalene | mg/L | 0.5-5 |
| Benzyl alcohol | mg/L | 5-30 |
| 2-methylphenol | mg/L | 1-5 |
| 3-methylphenol | mg/L | 1-5 |
| 4-methylphenol | mg/L | 1-5 |
| TOC | mg/L | 20-150 |

In terms of performance of treatment, ultrafiltration reduced the concentration of oils and matter in suspension to levels according to the Table 4 here below,

TABLE 4

| Compound | Concentration in treated effluent (in mg/l) | Reduction rate (in %) |
|---|---|---|
| Insoluble hydrocarbons | 0.2 á 0.5 | 99 to 99.96 |
| Matter in suspension | 0.1 á 0.5 | 99 to 99.9 |
| Polyaromatic hydrocarbons | 20 á 50 | 80 to 90 |

The resins for their part were used to obtain the reduction levels collated in the table 5 here below:

TABLE 5

| | Resin 1 (%) | Resin 2 (%) |
|---|---|---|
| Benzene | 99.5 ± 0.5 | 99.9 ± 0.1 |
| Toluene | 99.5 ± 0.5 | 99.9 ± 0.1 |
| Ethylbenzene | 99.5 ± 0.5 | 99.8 ± 0.1 |
| Xylene | 99.5 ± 0.5 | 99.8 ± 0.1 |
| Phenol | 96.5 ± 0.5 | 99.9 ± 0.1 |
| Naphtalene | 99.7 ± 0.3 | 99.9 ± 0.1 |
| Benzyl alcohol | 84.0 ± 1.0 | 99.5 ± 0.5 |
| 2-methylphenol | 99.5 ± 0.5 | 99.9 ± 0.1 |
| 3-methylphenol | 99.5 ± 0.5 | 99.9 ± 0.1 |
| 4-methylphenol | 99.5 ± 0.5 | 99.9 ± 0.1 |
| TOC | 50.0 ± 5.0 | 85.0 ± 5.0 |

In terms of regeneration capacity, the resins were regenerated by steam. This regeneration enables the absorption capacities of the resins to be recovered by up to 80%. In addition, the condensation of the steam made it possible to separate the organic matter adsorbed on the first resin. The conditions and the results of this regeneration are indicated in the table 6.

TABLE 6

| Duration of cycle | 7 days |
|---|---|
| Characteristics of steam | Resin 1: 125° C. at 2.4 bar |
| | Resin 2: 150° C. at 5.0 bar |
| % of valorized matter | 99% ± 1 |

Regeneration with ethanol gave the same performance as that of steam, in terms of recovery of adsorption capacities and organic matter content capable of being valorized after evaporation and recovery of ethanol.

The mode of regeneration that combines steam as a regeneration medium with ethanol, one in every ten regeneration cycles, showed better performance in terms of rate of recovery of capacity of adsorption of resins. This capacity is increased and reaches 95%.

The reverse osmosis filtration unit 5 comprises membranes made of composite polyamide. They have the advantage of having low clogging and an ability to withstand temperatures of up to 85° C. This unit herein comprises two cascade-mounted stages. It could include a single dual-pass stage. The number of stages or passes could be greater. The treated water coming from the reverse osmosis filtration unit is collected by the pipe 51 for example for re-utilization as industrial water, for example to produce steam. The wastes coming therefrom are discharged by the pipe 52. The reverse osmosis reduces alkalinity, salinity, hardness silica and boron.

The behavior of the reverse osmosis in terms of cleaning frequency is similar to the classic cases of desalination by reverse osmosis at ambient temperature.

The conversion rate (flow rate of the permeate/flow rate of supply) of the reverse osmosis unit in using a dual-stage configuration reaches 83%.

The pressure needed, with a salinity of 20000 mg/L, for a conversion rate of 83% in a dual-stage configuration at 60° C. is 25 bars instead of 46 to 50 bars for 25° C.

The quality of the water obtained in a single-pass configuration of reverse osmosis is collated in the following table 7:

TABLE 7

| Parameters | mg/L |
|---|---|
| Salinity | 70-450 |

TABLE 7-continued

| Parameters | mg/L |
| --- | --- |
| Alcalinity | 10-40 mg/L CaCO$_3$ |
| Hardness | 3-30 mg/L CaCO$_3$ |
| Silica | 0.8-6.5 |

The quality of water obtained in a dual-pass configuration of reverse osmosis is collated in the following table 8:

TABLE 8

| Parameters | mg/L |
| --- | --- |
| Salinity | 10-12 |
| Alcalinity | 0.3-1 mg/L CaCO$_3$ |
| Hardness | 0.1-0.15 mg/L CaCO$_3$ |
| Silica | 0.02-0.15 |

The invention claimed is:

1. A method of treating wastewater containing matter in suspension, insoluble hydrocarbons, organic matter including aromatic compounds and dissolved solids, the method comprising:
removing the matter in suspension and the insoluble hydrocarbons from the wastewater by filtering the water with a microfiltration or ultrafiltration membrane module which produces a permeate and a concentrate containing the matter in suspension and the insoluble hydrocarbons, wherein the wastewater is produced water from petroleum or gas fields;
heating the concentrate;
after heating the concentrate, recovering the insoluble hydrocarbons in the concentrate by directing the concentrate to a centrifuge and centrifuging the concentrate;
directing the permeate from the microfiltration or ultrafiltration membrane module through two separate columns disposed in series where one column contains a non-ionic cross-linked polymer resin and the other column contains microporous carbon resins;
as the permeate flows through the two columns, removing the organic matter including the aromatic compounds by adsorbing the organic matter including the aromatic compounds onto the resins in the columns; and
after the permeate has flowed through the two columns in series, removing the dissolved solids by directing the permeate from the microfiltration or ultrafiltration membrane module through a reverse osmosis filtration unit.

2. The method of claim 1 including regenerating the resins in the columns by directing a solvent into and through the columns resulting in a solvent charged with organic matter; regenerating the solvent charged with organic matter by directing the solvent charged with organic matter to an evaporation process and evaporating the solvent charged with organic matter to produce a condensed solvent that is recycled to the columns and an organic phase having adsorbed organic matter.

3. The method of claim 1 including regenerating the resins in the columns by directing steam into and through the columns; condensing the steam in the columns which results in the production of an aqueous phase constituted by water saturated with organic compounds.

4. The method of claim 1 wherein the water is not biologically treated, does not produce biological sludge and is not cooled.

5. A method of treating wastewater containing matter in suspension and organic matter including aromatic compounds and dissolved solids, the method comprising:
removing the matter in suspension from the wastewater by filtering the water with a microfiltration or ultrafiltration membrane module which produces a permeate and a concentrate containing the matter in suspension, wherein the wastewater is produced water from petroleum or gas fields;
directing the permeate from the microfiltration or ultrafiltration membrane module through two separate columns disposed in series where one column contains a non-ionic cross-linked polymer resin and the other column contains microporous carbon resins;
as the permeate flows through the two columns, removing the organic matter including the aromatic compounds by adsorbing the organic matter including the aromatic compounds onto the resins in the columns; and
after the permeate has flowed through the two columns in series, removing the dissolved solids by directing the permeate from the microfiltration or ultrafiltration membrane module through a reverse osmosis filtration unit.

6. The method of claim 5 including regenerating the resins in the columns by directing a solvent into and through the columns resulting in a solvent charged with organic matter; regenerating the solvent charged with organic matter by directing the solvent charged with organic matter to an evaporation process and evaporating the solvent charged with organic matter to produce a condensed solvent that is recycled to the columns and an organic phase having adsorbed organic matter.

7. The method of claim 5 including regenerating the resins in the columns by directing steam into and through the columns; condensing the steam in the columns which results in the production of an aqueous phase constituted by water saturated with organic compounds.

8. The method of claim 5 wherein the water is not biologically treated, does not produce biological sludge and is not cooled.

9. The method of claim 1 wherein the produced water contains benzene, toluene, ethylbenzene and xylene; and wherein the non-ionic crosslinked polymer resin reduces the concentration of benzene, toluene, ethylbenzene and xylene 99.5+/−-0.5%.

10. The method of claim 5 wherein the produced water contains benzene, toluene, ethylbenzene and xylene; and wherein the non-ionic crosslinked polymer resin reduces the concentration of benzene, toluene, ethylbenzene and xylene 99.5+/−-0.5%.

* * * * *